(12) United States Patent
Burton

(10) Patent No.: US 6,974,231 B2
(45) Date of Patent: Dec. 13, 2005

(54) ADJUSTER AND BRACKET ASSEMBLY

(75) Inventor: John Burton, Ludington, MI (US)

(73) Assignee: Burton Technologies, LLC, Ludington, MI (US)

(*) Notice: Subject to any disclaimer, the term of this patent is extended or adjusted under 35 U.S.C. 154(b) by 0 days.

(21) Appl. No.: 10/290,090

(22) Filed: Nov. 7, 2002

(65) Prior Publication Data

US 2004/0090780 A1 May 13, 2004

(51) Int. Cl.[7] ............................................. F21V 21/26
(52) U.S. Cl. .................... 362/273; 362/428; 362/523
(58) Field of Search .............................. 362/273, 428, 362/319, 277, 296, 341, 251, 289, 427, 449, 462, 463, 504, 512, 514, 528, 515, 421, 523, 529

(56) References Cited

U.S. PATENT DOCUMENTS

| 4,412,275 | A |   | 10/1983 | McMahan |
|---|---|---|---|---|
| 4,503,486 | A | * | 3/1985 | Makita ........................ 362/515 |
| 4,580,202 | A |   | 4/1986 | Morette |
| 5,214,971 | A |   | 6/1993 | Burton et al. |
| 5,446,630 | A | * | 8/1995 | Chikada et al. .............. 362/463 |
| 5,526,238 | A |   | 6/1996 | Van Oel et al. |
| 5,707,133 | A |   | 1/1998 | Burton |
| 5,743,618 | A |   | 4/1998 | Fujino et al. |
| 6,017,136 | A | * | 1/2000 | Burton ........................ 362/273 |
| 6,113,301 | A |   | 9/2000 | Burton |
| 6,244,735 | B1 |   | 6/2001 | Burton |
| 6,247,868 | B1 |   | 6/2001 | Burton |
| 6,257,747 | B1 |   | 7/2001 | Burton |
| 6,260,993 | B1 | * | 7/2001 | Ito .............................. 362/514 |
| 6,481,880 | B2 | * | 11/2002 | Mizuno et al. .............. 362/514 |
| 6,550,948 | B1 |   | 4/2003 | Filbrun et al. |

* cited by examiner

Primary Examiner—John Anthony Ward
Assistant Examiner—Bao Q. Truong
(74) Attorney, Agent, or Firm—Brian G. Gilpin; Godfrey & Kahn, S.C.

(57) ABSTRACT

A lamp assembly that may be used as a fog lamp or headlamp includes a mounting bracket, a reflector, and an adjuster. The reflector is pivotably mounted to the mounting bracket and the adjuster is secured to the reflector. The adjuster is also secured to the mounting bracket such that rotation of an aiming screw forming part of the adjuster causes pivoting of the reflector and aiming of the lamp. The bracket and adjuster are provided in pre-assembled fashion such that the lamp may be easily attached thereto.

10 Claims, 14 Drawing Sheets

ADJUSTER AND BRACKET ASSEMBLY

BACKGROUND OF THE INVENTION

This invention relates generally to adjusters and brackets, and in particular to a combination adjuster and bracket assembly for use in connection with sealed-beam reflector style lamps but is not limited to sealed reflectors.

Sealed-beam style reflector lamp assemblies used as vehicle headlights or fog lights typically comprise several basic parts: a mounting bracket, a sealed-beam lamp (generally including a reflector sealed to a lens with a bulb therein), and at least one adjuster. The mounting bracket is secured to the vehicle and the lamp is pivotably attached thereto so as to allow the aim of the lamp to be adjusted using the adjuster. The mounting bracket and adjuster are typically separately supplied to the manufacturer of the lamp which assembles the components together and provides a completed lamp assembly to the automobile manufacturer.

Conventionally, adjusters are supplied by a subcontractor to the company producing the completed sealed-beam reflector lamp assembly, typically the manufacturer of the lamp. The manufacturer of the lamp attaches the adjuster components to the mounting bracket and to the reflector so as to create a completed lamp assembly. Because of the multiple steps required to assemble the completed lamp assembly using conventional adjusters, the adjusters are supplied to the lamp manufacturer in their component parts which are installed to the lamp and the bracket. Once assembly is completed, the lamp assembly is shipped to the automobile manufacturer for installation to the vehicle. Thus, in order to facilitate assembly of the complete lamp assembly, it is desirable to provide a single pre-assembled bracket and adjuster sub-assembly to the company producing the completed lamp assembly.

Additionally, there are several drawbacks to conventional adjuster and bracket designs used in sealed-beam lamp assemblies. First, the installation of conventional adjusters requires multiple steps at the time of installation to the mounting bracket and lamp including using the adjuster to pre-aim the reflector within the bracket so that little to no adjustment is needed once the lamp assembly is installed into the vehicle. Second, the use of conventional adjusters requires the lamp manufacturer to separately stock the multiple parts required to complete the assembly and installation of the adjuster. Finally, the fin that extends from the back side of the reflector to engage the adjuster often requires a hole perpendicular to molding die draw and a thick wall which both adds tooling expense and may create difficulties in the molding of optically correct lamps.

Accordingly, a need exists for an adjuster and bracket assembly design that is more efficiently assembled by the lamp manufacturer, eliminates pre-aiming of the reflector, reduces tooling expenses and molding difficulties, is provided to the final lamp manufacturer as a single piece, and is cost-effective. The present invention relates to a combination adjuster and bracket for automotive lamps and to solutions to some of the problems raised or not solved by existing adjusters and brackets. Of course, the present invention may be used in connection with fog lamps and regular headlamps and may also have application in a multitude of non-automotive lamp assemblies where similar performance capabilities are required. The present invention may also be used on internally movable reflector lamps (such as the one disclosed in U.S. Pat. No. 6,017,136, the disclosure of which is incorporated herein by reference) by including the bracket features disclosed herein inside the lamp housing and providing access to the adjuster through a covered access port or protruding the aiming screw head through a sealed hole in the housing. Additionally, the invention may be adapted to provide two adjusters on a single bracket so as to allow adjustment in both vertical and horizontal directions.

SUMMARY OF THE INVENTION

The present invention provides an adjuster and bracket assembly that is cost-effective, easily mated to a lamp, and is adaptable for use in connection with various types of lamps. One embodiment of the invention includes a mounting bracket that is mountable to a vehicle. A lamp including a reflector, bulb, and lens is pivotably attached to the mounting bracket using posts molded into the reflector that snap-fit into the mounting bracket. An adjuster is provided between the reflector and the mounting bracket such that rotation of an aiming screw forming part of the adjuster causes pivoting of the reflector. A number of different adjusters and methods for causing the pivoting may be used. The pivoting of the lamp adjusts the aim of the reflector. The bracket may be oriented within the vehicle so as to allow manipulation of the adjuster and adjustment of the aim of the lamp from the rear of the lamp assembly from the top, bottom, or side thereof.

In another embodiment of the present invention, a mounting bracket, lamp, and adjuster are also provided. In this embodiment, the adjuster is oriented so as to allow manipulation of the adjuster and aim of the lamp from the front (or lens side) of the lamp. If desired for aesthetics or aerodynamics, access to the adjuster may be provided through the lens and/or reflector of the lamp.

One possible application of the present invention is in automotive lamp assemblies, in particular headlamps and fog lamps, but many other applications are possible and references to use in an automotive headlamp assembly should not be deemed to limit the uses of the present invention. While certain embodiments are discussed herein, they should not be interpreted as being the only embodiments of the present invention and other embodiments, such as the use of two adjusters to allow dual-axis pivoting, may be created without departing from the present invention. These and other objects and advantages of the present invention will become apparent from the detailed description, claims, and accompanying drawings.

DETAILED DESCRIPTION OF THE PREFERRED EMBODIMENTS

Figure 1:
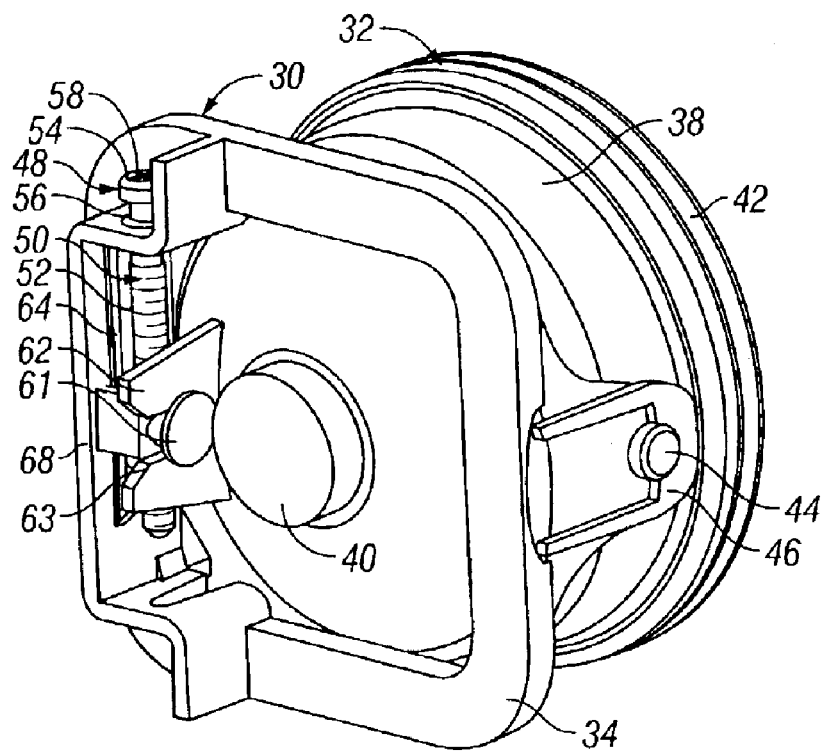
FIG. 1 is a rear perspective view of a mounting bracket, lamp, and adjuster in accordance with one embodiment of the assembly.
Figure 2:
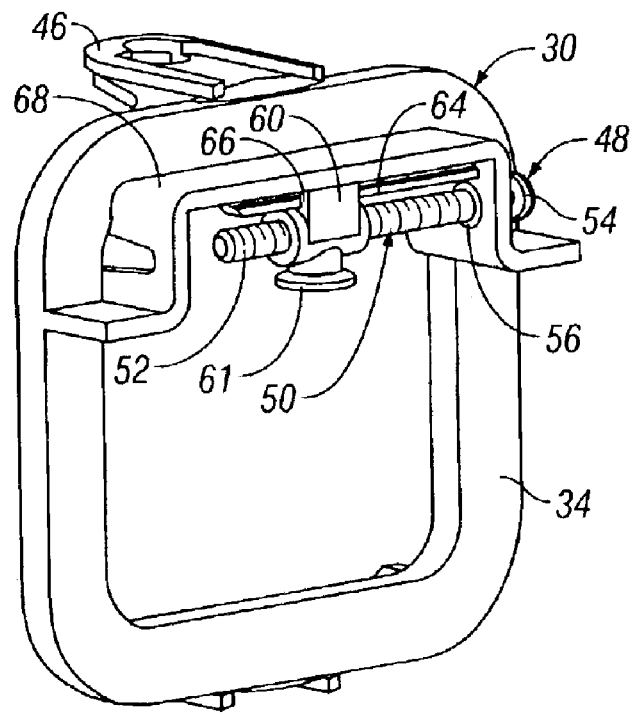
FIG. 2 is a rear perspective view of the assembly of FIG. 1, shown without the lamp.
Figure 4:
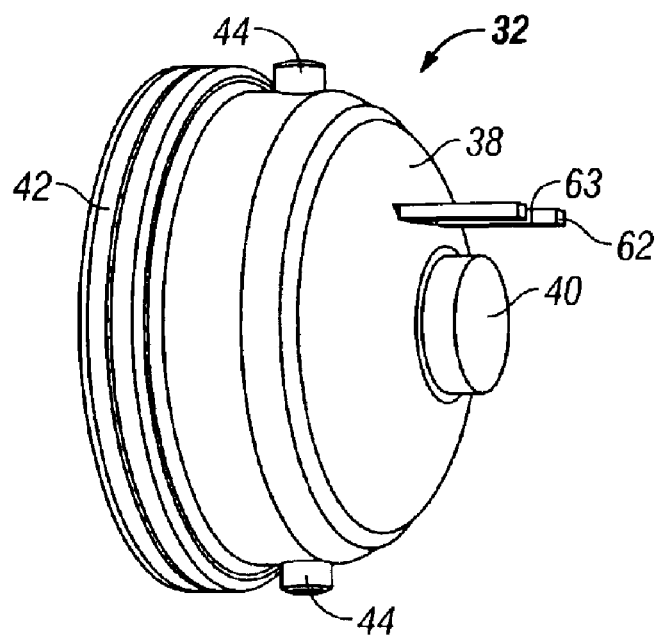
FIG. 4 is a rear perspective view of the lamp of FIG. 1.
Figure 7:
FIG. 7 is a detailed perspective view of the aiming screw portion of the adjuster shown in FIG. 1.

FIG. 1 shows one embodiment of an adjuster and bracket assembly (identified generally as 30) in accordance with one embodiment of the present invention, shown attached to a lamp 32. The adjuster and bracket assembly 30 includes a mounting bracket 34 that may be mounted to a vehicle (not shown) using threaded mounting studs 36 (see, e.g., FIG. 8) or other means known in the industry. The lamp 32 (shown independently in FIG. 4) including a reflector 38, bulb 40 (rear of which shown), and lens 42 is pivotably attached to the mounting bracket 34 using posts 44 molded into the reflector 38 that snap-fit into arms 46 extending from the mounting bracket 34. The lamp 32 is free to pivot about an axis between the posts 44. An adjuster (identified generally as 48) is provided between the lamp 32 and the mounting bracket 34 such that rotation of an aiming screw 50 (shown independently in FIG. 7) forming part of the adjuster 48 causes pivoting of the lamp 32. The pivoting of the lamp 32 adjusts the aim of the lamp 32.

As shown in FIG. 1, and in more detail in FIGS. 2, 3, 6, and 7, the adjuster 48 includes a number of parts. The adjuster 48 includes an aiming screw 50 that has a threaded portion 52, a head 54, and at least one positioning and securement ridge 56. The embodiment of the aiming screw 50 shown in FIGS. 1–3, and 7 has two positioning and securement ridges 56. The positioning and securement ridges 56 help journal the aiming screw 50 within the mounting bracket 34. As an alternative, the head 54 can be used to help journal the aiming screw 50 in the mounting bracket 34 and other alternative designs that help journal the aiming screw 50 within the mounting bracket 34 are possible without departing from the invention. The head 54 of the aiming screw 50 has a driver-receiving recess 58 that can be adapted to accommodate a variety of drivers (a phillips-head driver-receiving recess 58 is shown). The threaded portion 52 of the aiming screw 50 is extended along at least a portion of the length of the aiming screw 50. The threaded portion 52 is threaded into a screw boss 60 (shown in detail in FIG. 6) that has a tab 61 engaged with a V-shaped slot 63 in a fin 62 extending from the reflector 38 of the lamp 32. Because the screw boss 60 is threaded to the threaded portion 52 of the aiming screw 50, rotation of the aiming screw 50 causes movement of the screw boss 60 along the axis of the aiming screw 50, corresponding movement of the reflector 38, and pivoting and aiming of the lamp 32. In order to allow for the change in angular orientation of the aiming screw 50 with respect to the lamp 32 when aim adjustment occurs, the screw boss 60 is in pivotable engagement with the fin 61 of the reflector 38 of the lamp 32.

Figure 5:
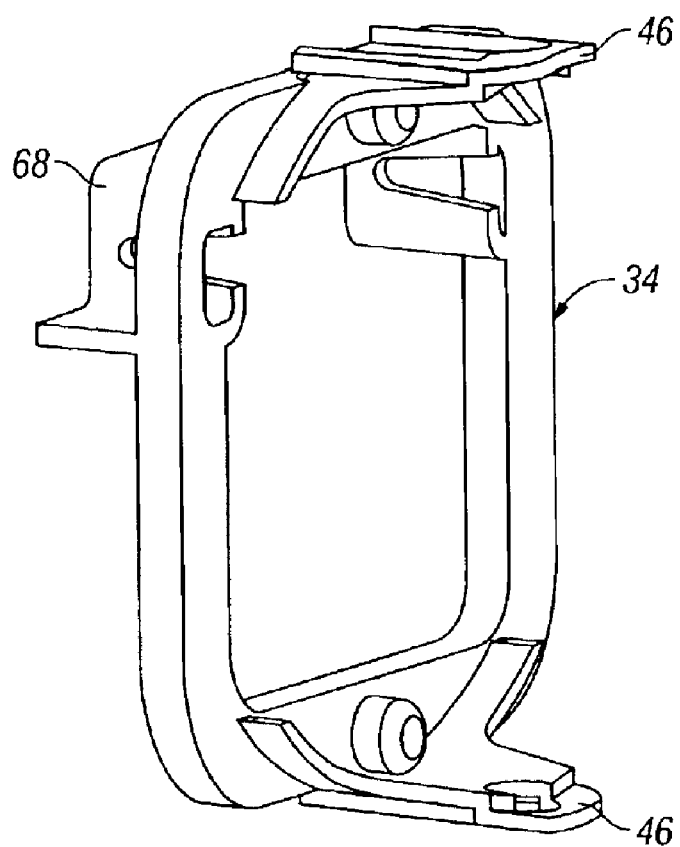
FIG. 5 is a front perspective view of the mounting bracket of FIG. 1.

The mounting bracket 34 (shown independently in FIG. 5) may be formed in a variety of shapes such that it is capable of acting as an effective platform for mounting the lamp 32 and adjuster 48. In the embodiment shown in FIG. 1, the mounting bracket 34 has a generally square shape with two arms 46 extending therefrom to engage the posts 44 of the reflector 38. Of course, other shapes could be used for the mounting bracket 34. In this embodiment, the mounting bracket 34 further includes a T-shaped rail 64 on which the screw boss 60 rides to, along with the journaling provided by the positioning and securement ridges 56, maintain the positioning of the aiming screw 50. Alternatively, as shown in FIG. 6B, the mounting bracket 34 can include an L-shaped rail 65. The mounting bracket 34 further includes an adjuster bracket 68, which positions the adjuster 48 within the mounting bracket 34.

Figure 3:
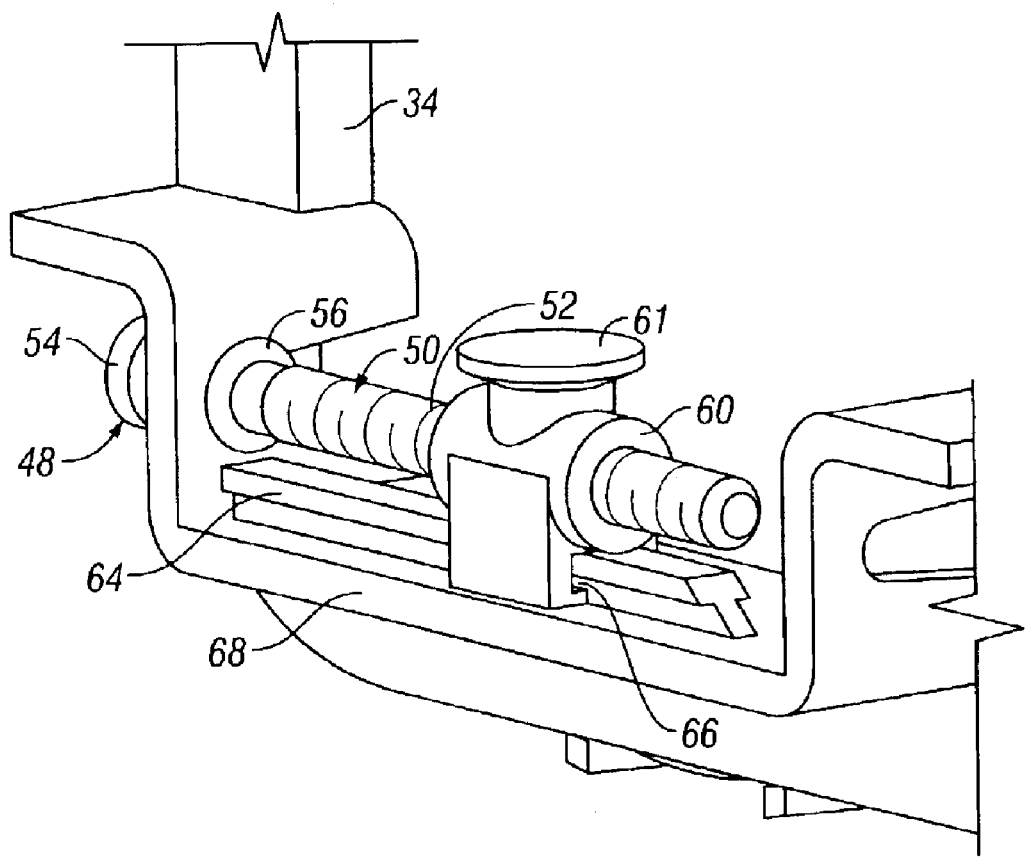
FIG. 3 is a detail perspective view of the assembly shown in FIG. 2, showing the adjuster attached to the mounting bracket.
Figure 6:
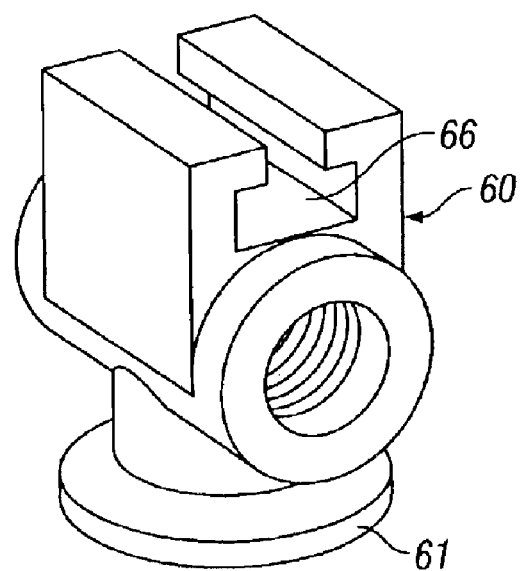
FIG. 6 is detailed perspective view of the screw grommet portion of the adjuster shown in FIG. 1.
Figure 6A:
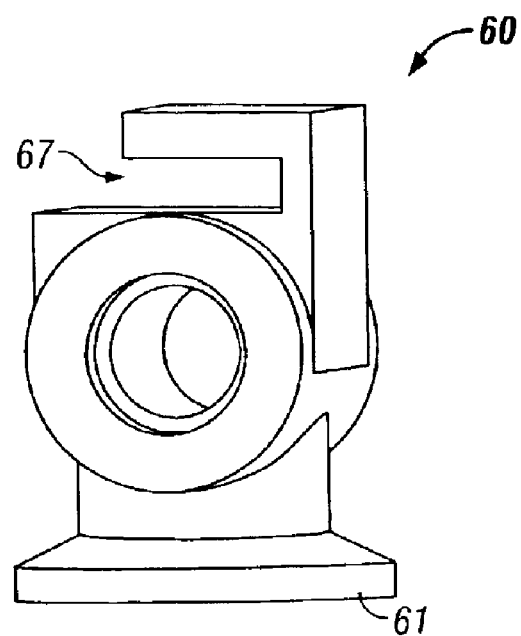
FIG. 6A is a detail perspective view of one alternative embodiment of the screw grommet portion of the adjuster.
Figure 6B:
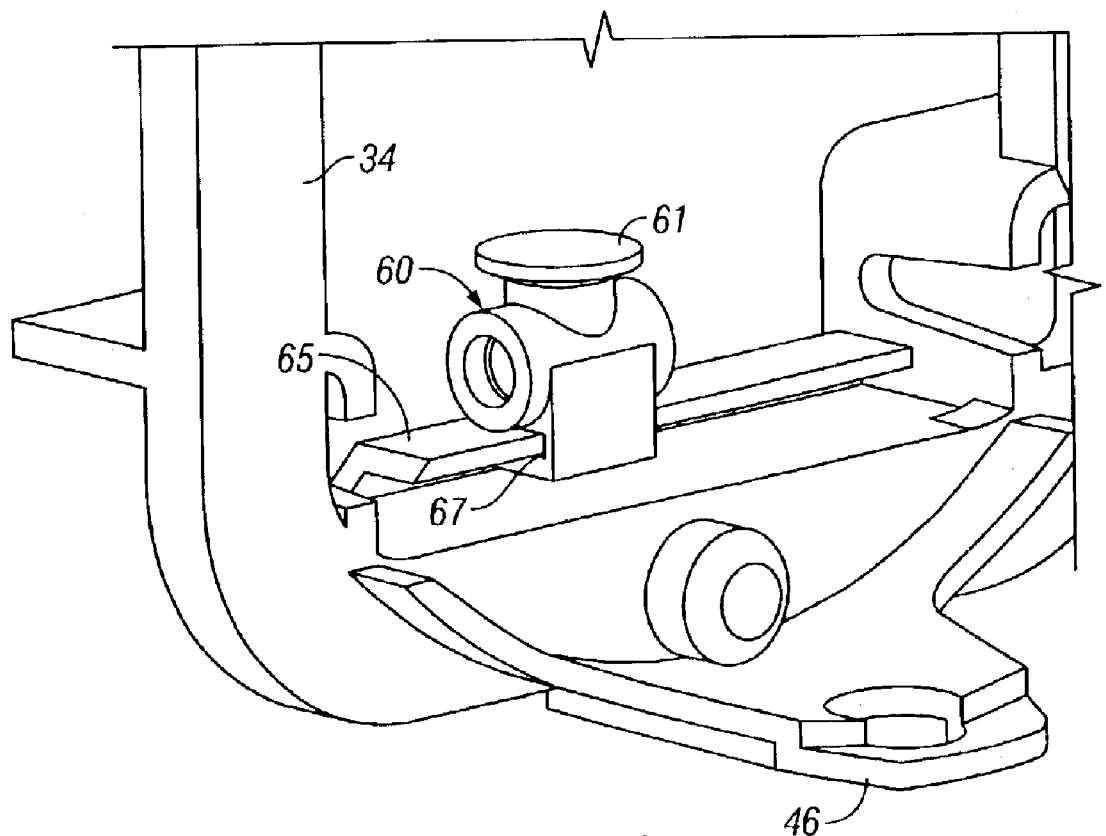
FIG. 6B is a detail perspective view of the screw grommet of FIG. 6, shown mounted to a correspondingly-shaped rail.

As shown in detail in FIGS. 3 and 6, the screw boss 60 has a T-shaped slide 66 in which the T-shaped rail 64 of the mounting bracket 34 is engaged. Of course, other configurations could be used for the screw boss 60, T-shaped slide 66, and T-shaped rail 64 without departing from the invention. One alternative configuration is the L-shaped rail 65 and L-shaped slide 67 shown in FIGS. 6A and 6B.

The adjuster and bracket assembly 30 may be oriented within the vehicle so as to allow manipulation of the adjuster 48 and adjustment of the aim of the lamp 32 from the rear of the adjuster and bracket assembly 30 from the top, bottom, or side thereof. The embodiment shown in FIG. 1 reflects an orientation of the adjuster and bracket assembly 30 such that the aim of the lamp 32 may be accomplished from the top thereof.

In assembling the adjuster and bracket assembly 30 reflected in FIGS. 1–7, the positioning and securement ridge 56 of the aiming screw 50 is first fit into a slot 74 the adjuster bracket 68 portion of the mounting bracket 34 that allows the aiming screw 50 to rotate put prevents axial movement. The screw boss 60 then slides over a guide rail, such as the T-shaped rail 64 or the L-shaped rail 65, until it reaches the threaded portion 52 of the aiming screw 50. The aiming screw 50 is then rotated until the screw boss 60 is engaged thereon and positioned for mating to the reflector 38 such that the lamp 32 will be properly aimed when assembled. If an L-shaped slide 67 is used in the screw boss 60 and an L-shaped rail 65 is provided on the mounting bracket 34, the screw boss 60 can first be threaded to the aiming screw 50 before connection to the mounting bracket 34. In this assembly sequence, the assembled aiming screw 50 and screw boss 60 combination are then installed to the mounting bracket 34 prior to attaching the lamp 32. The completed adjuster and bracket assembly 30 is then ready for the attachment of the reflector 38. The installer of the reflector 38 snap-fits the posts 44 extending from the reflector 38 into the arms 46 extending from the mounting bracket 34, thereby simultaneously mating the U-shaped slot 63 in the fin 62 extending from the reflector 38 with the tab 61 extending from the screw boss 60. Once the reflector 38 is installed, both the aiming screw 50 and the screw boss 60 are fully captioned within the mounting bracket 34. The lamp assembly is then complete, pre-aimed, and ready to be installed to a vehicle.

Figure 8:
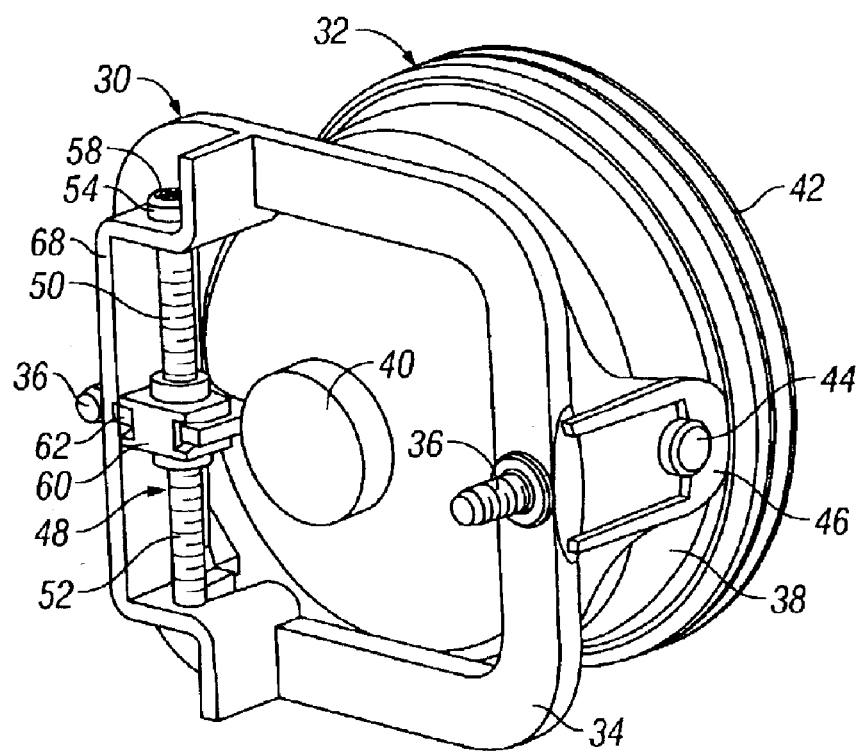
FIG. 8 is a rear perspective view of a mounting bracket, lamp, and adjuster in accordance with another embodiment of the assembly.
Figure 9:
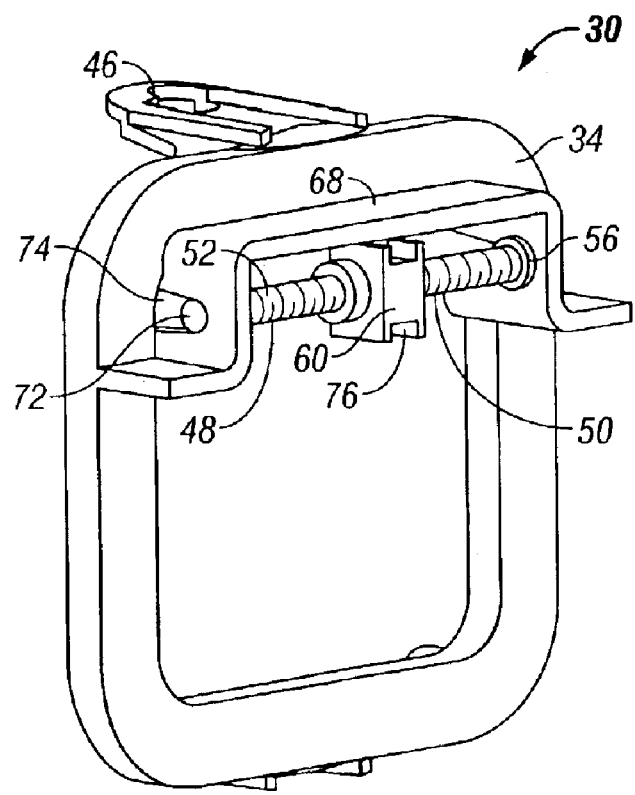
FIG. 9 is a rear perspective view of the assembly of FIG. 8, shown without the lamp.
Figure 10:
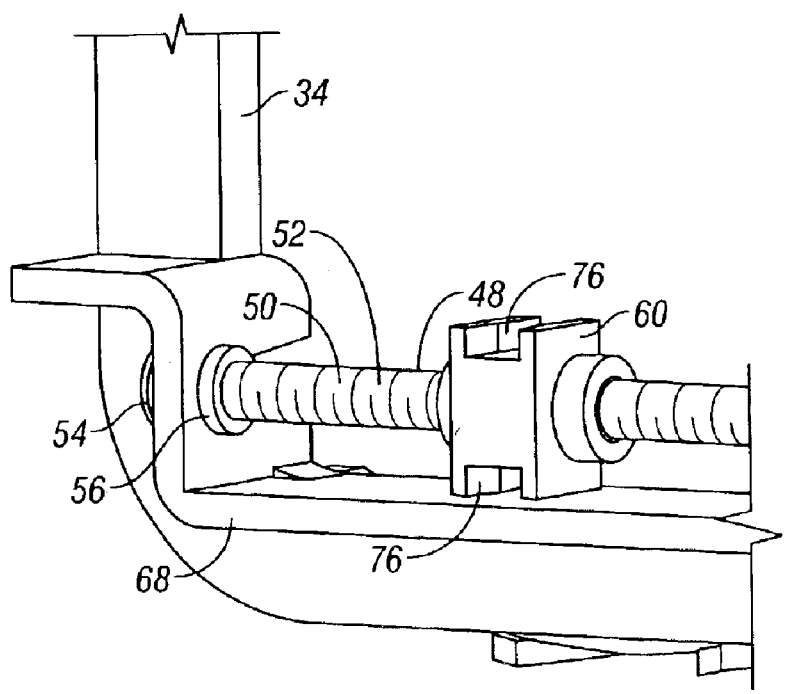
FIG. 10 is a detail perspective view of the assembly shown in FIG. 9, showing the adjuster attached to the mounting bracket
Figure 11:
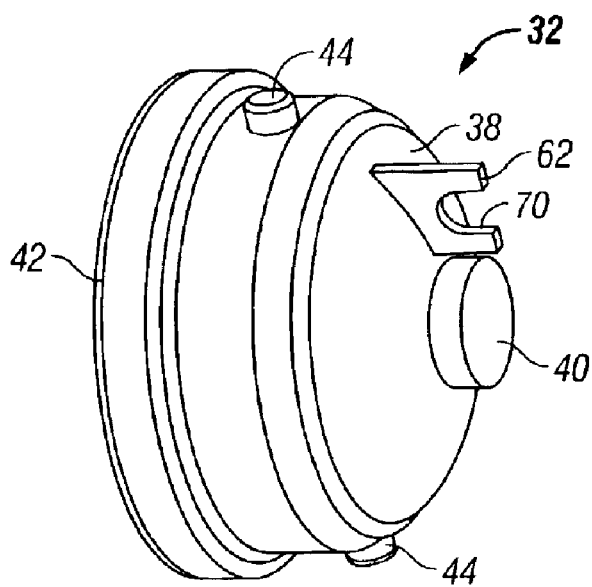
FIG. 11 is a rear perspective view of the lamp of FIG. 8.
Figure 12:
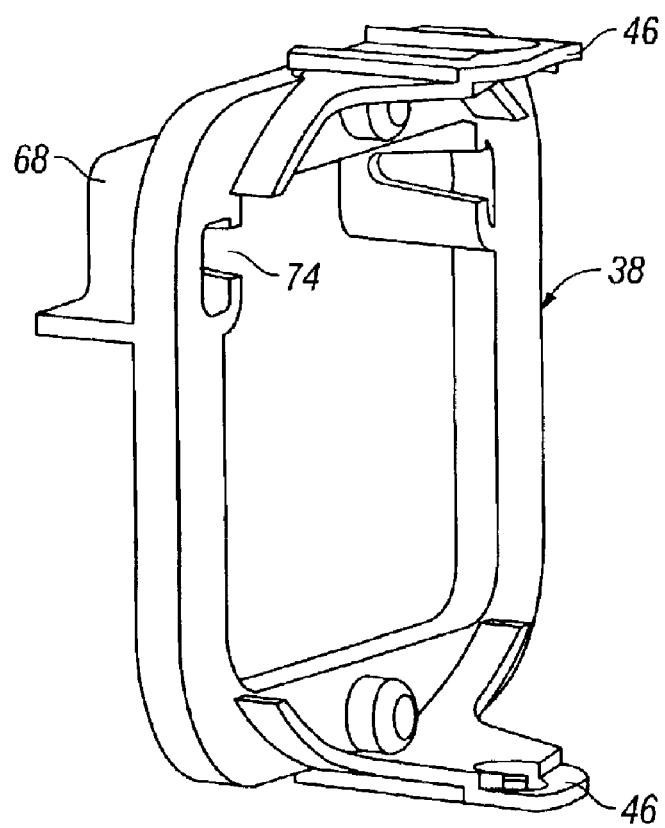
FIG. 12 is a front perspective view of the mounting bracket of FIG. 8.
Figure 13:
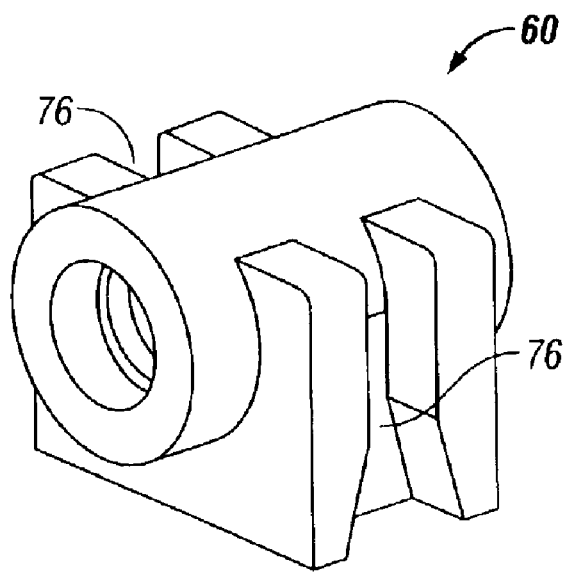
FIG. 13 is a detailed perspective view of the screw grommet portion of the adjuster shown in FIG. 8.
Figure 14:
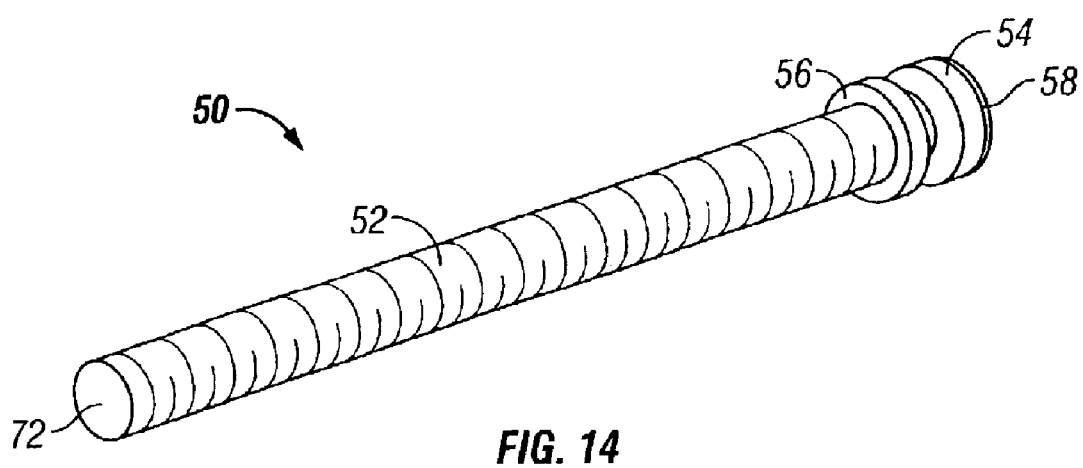
FIG. 14 is a detailed perspective view of the aiming screw portion of the adjuster shown in FIG. 8.

Another embodiment of the present invention is shown in FIGS. 8–14. This embodiment has a configuration somewhat similar to that of the embodiment shown in FIGS. 1–7 and the primary differences between the embodiments are described below. Of course, features used in each embodiment could be configured to be used in connection with the other embodiment. As shown in FIGS. 8 and 9, in this embodiment, the mounting bracket 34 also includes an adjuster bracket 68 used to position the adjuster 48. However, in this embodiment, the screw boss 60 does not include a T-shaped slide 66 or an L-shaped slide 67 (see FIGS. 10 and 13) and the mounting bracket 34 does not include a T-shaped rail 64 or an L-shaped rail 65 (see FIGS. 8 and 10). Rather, as best seen in FIGS. 9 and 10, in this embodiment, the aiming screw 50 is journaled on both ends within the adjuster bracket 68. The head 54 of the aiming screw 50 and a positioning and securement ridge 56 in combination journal the head 54 of the aiming screw 50 within the adjuster bracket 68 of the mounting bracket 34 and the end 72 of the aiming screw 50 is journaled in a slot or hole 74 in the adjuster bracket 68. As best seen in FIGS. 8, 9, 11, and 13, rather than using the tab 61 from the previously described embodiment, the screw boss 60 used in this embodiment includes engagement channels 76 with which a U-shaped slot 70 in the fin 62 is engaged. This embodiment is operated in the same fashion as the previously described embodiment in that because the screw boss 60 is threaded to the threaded portion 52 of the aiming screw 50, rotation of the aiming screw 50 causes movement of the screw boss 60 along the axis of the aiming screw 50, corresponding movement of the reflector 38, and pivoting and aiming of the lamp 32. In order to allow for the change in angular orientation of the aiming screw 50 with respect to the reflector 38 when aim adjustment occurs, the screw boss 60 is in pivotable engagement with the fin 62 of the reflector 38 of the lamp 32.

In assembling the embodiment of the adjuster and bracket assembly 30 reflected in FIGS. 8–14, the aiming screw 50 is rotated until the screw boss 60 is threaded thereon and positioned for mating to the reflector 38 after the adjuster 48 has been attached to the mounting bracket 34. The aiming screw 50 is then snap-fit into the adjuster bracket 68 portion of the mounting bracket 34 such that the end 72 of the aiming screw 50 is positioned in the slot 74 in the adjuster bracket and the head 54 and the positioning and securement ridge 56 journal the aiming screw 50 in the adjuster bracket 68. The completed adjuster and bracket assembly 30 is then ready for the attachment of the reflector 38. The installer of the reflector 38 snap-fits the posts 44 extending from the reflector 38 into the arms 46 extending from the mounting bracket 34, thereby simultaneously mating the U-shaped slot 70 in the fin 62 extending from the reflector 38 with the engagement channels 76 of the screw boss 60. The lamp assembly is then complete and ready to be installed to a vehicle.

Figure 15:
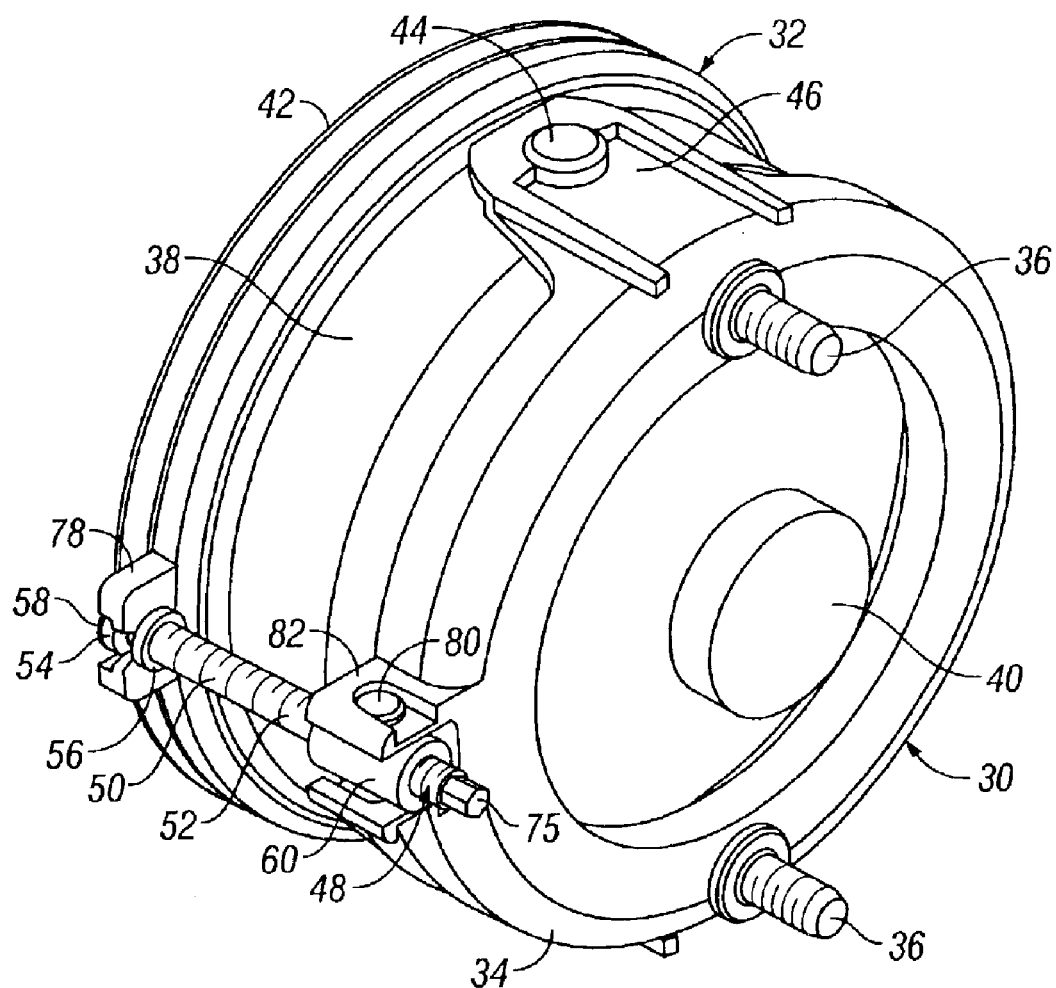
FIG. 15 is a rear perspective view of a mounting bracket, lamp, and adjuster in accordance with another embodiment of the assembly.
Figure 16:
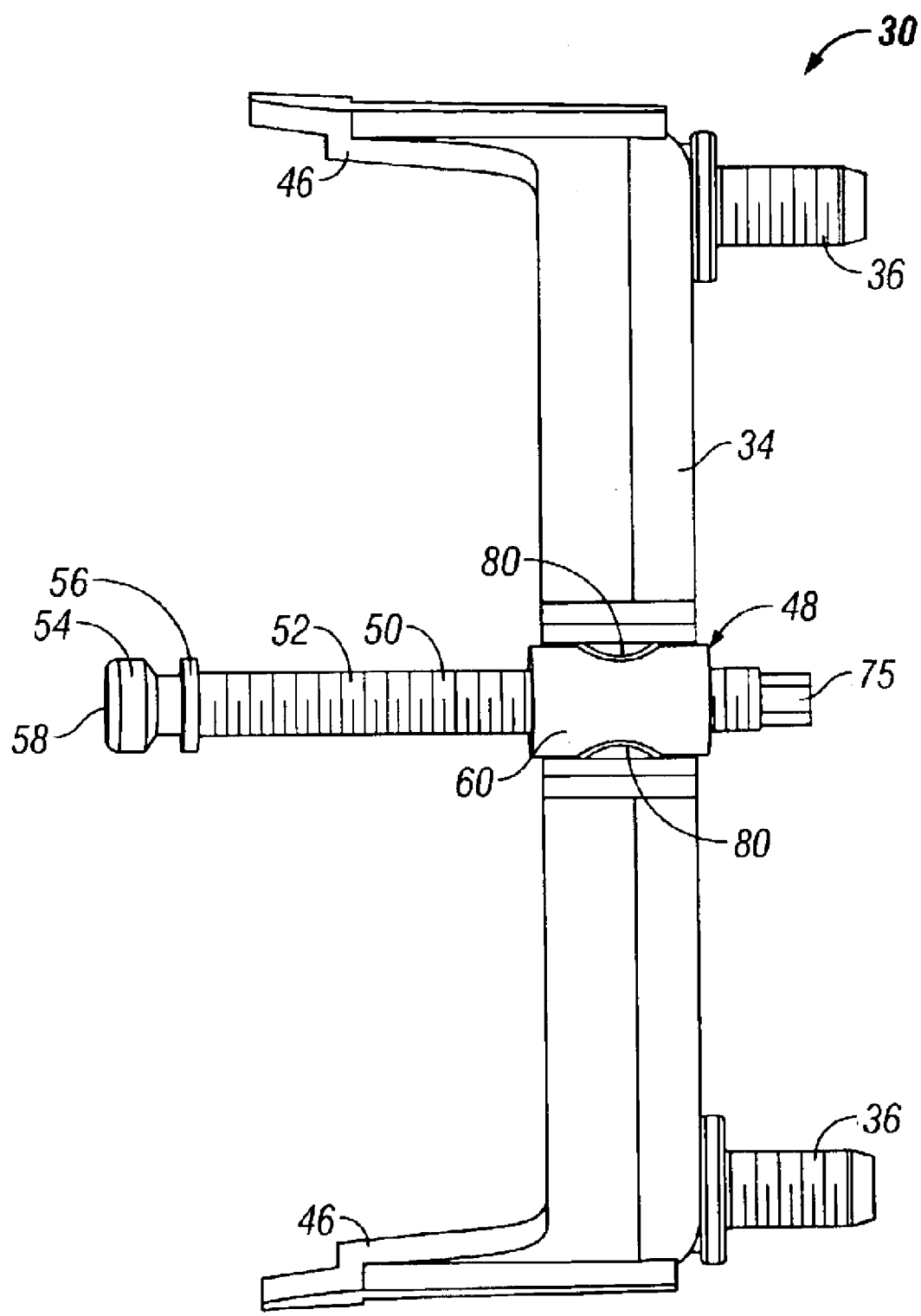
FIG. 16 is a side elevation of the assembly of FIG. 15, shown without the lamp.
Figure 17:
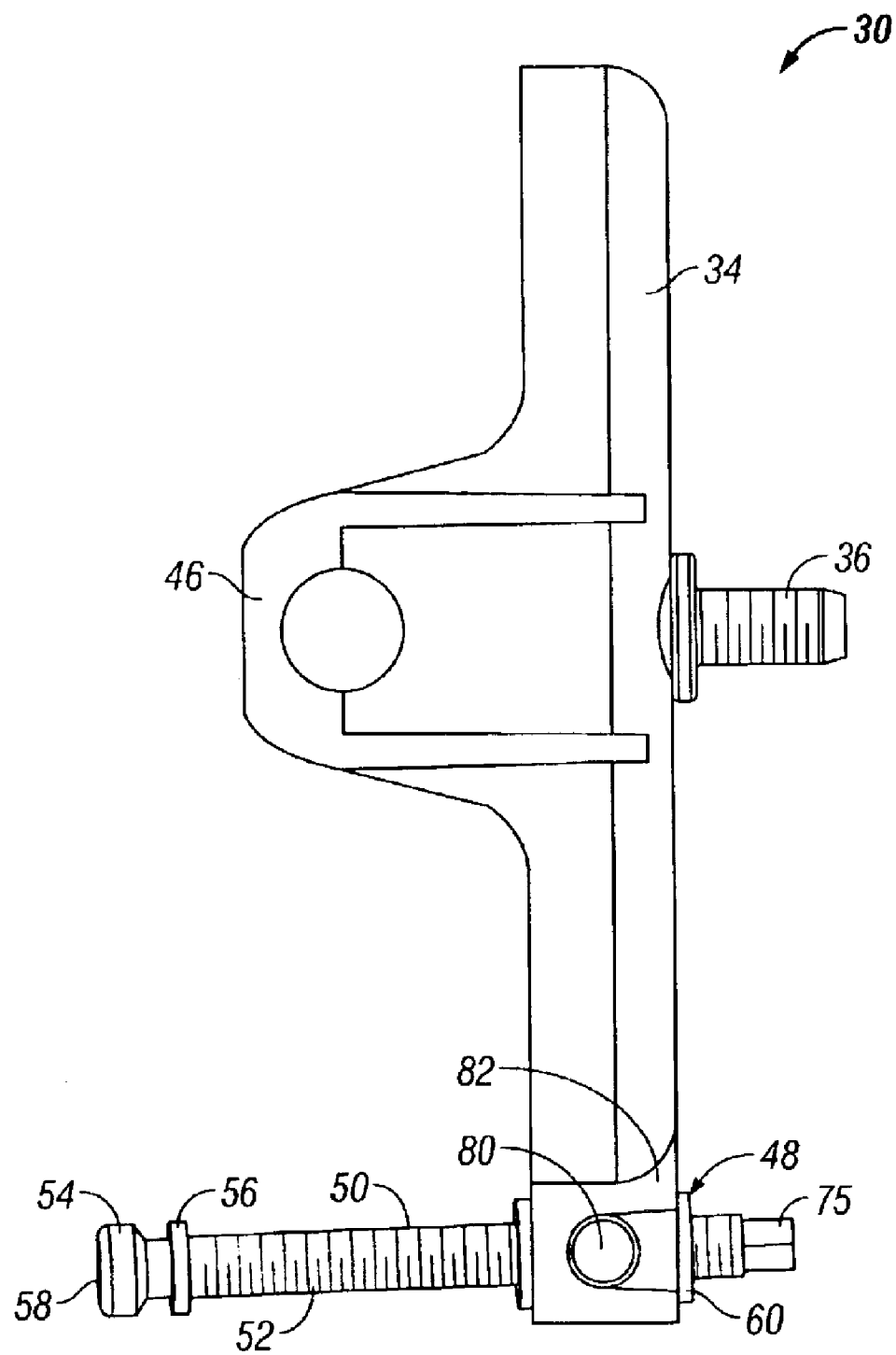
FIG. 17 is a top plan view of the assembly of FIG. 15, shown without the lamp.
Figure 18:
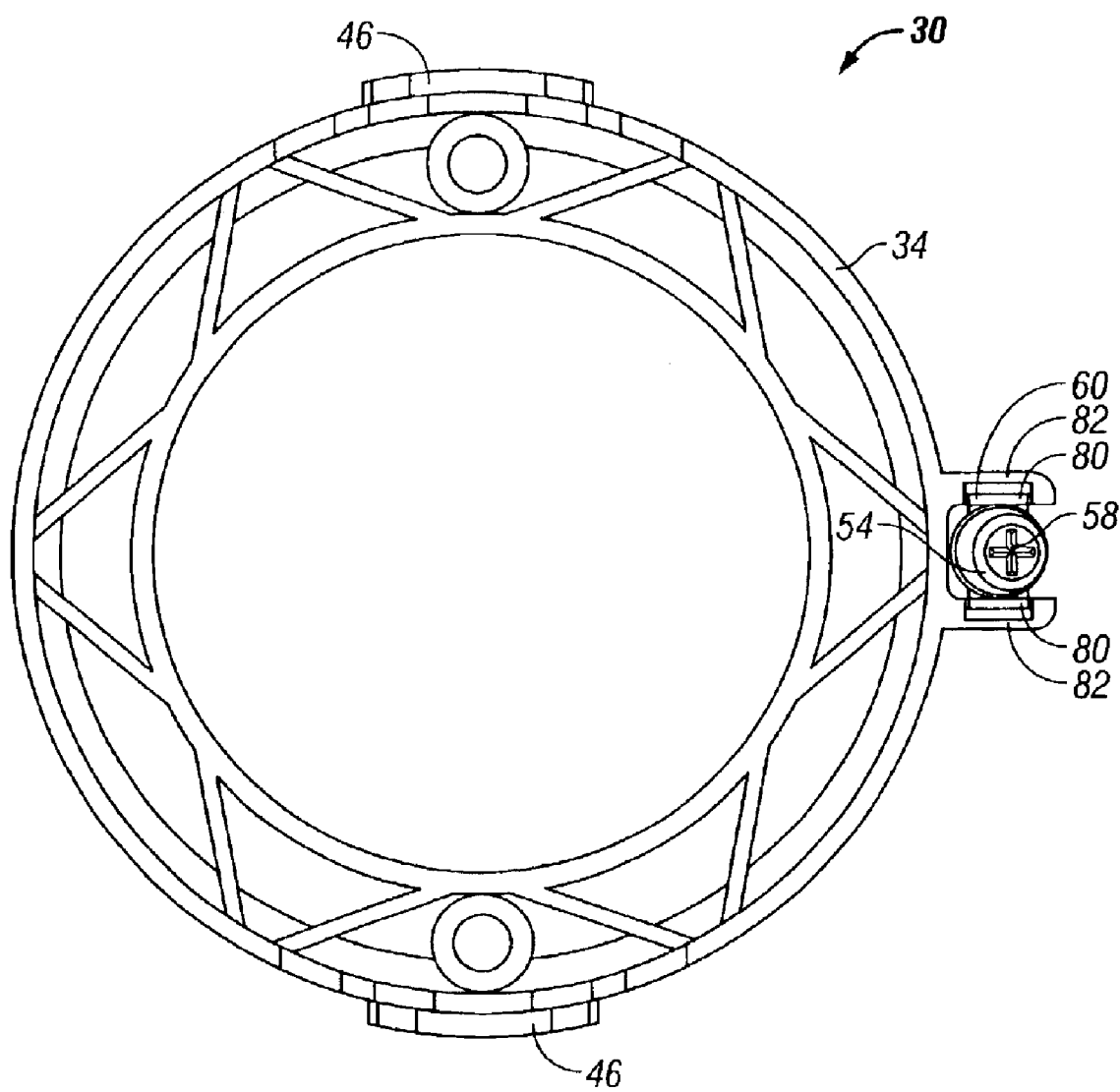
FIG. 18 is a front elevation of the assembly of FIG. 15, shown without the lamp.
Figure 19:
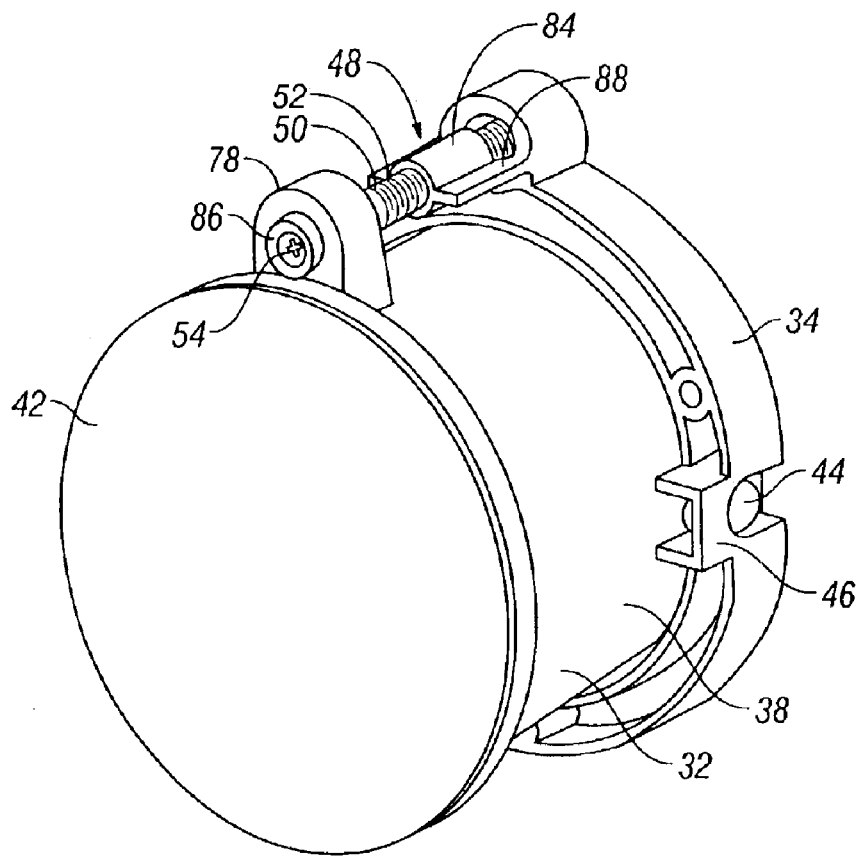
FIG. 19 is a front perspective view of a mounting bracket, lamp, and adjuster in accordance with another embodiment of the assembly.
Figure 20:
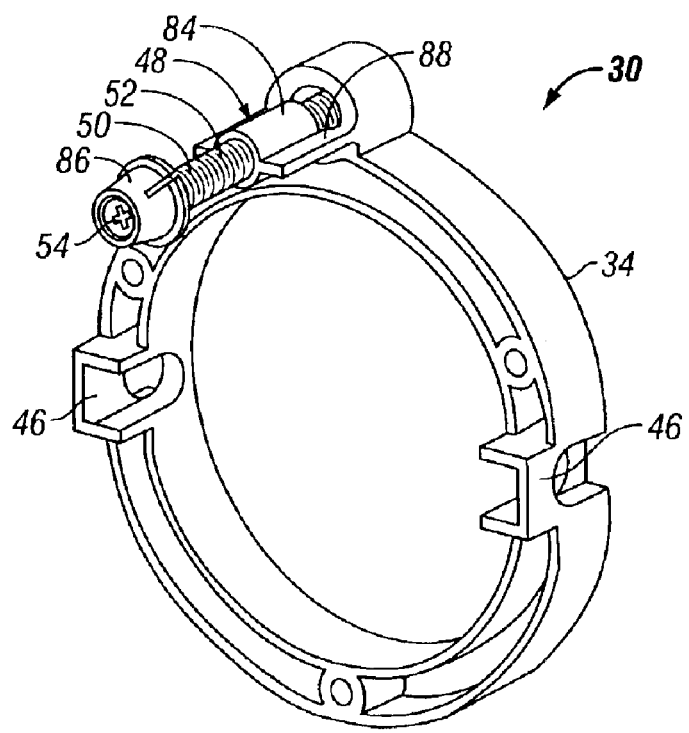
FIG. 20 is a front perspective view of the assembly of FIG. 19, shown without the lamp.

In another embodiment of the invention, shown in FIGS. 15–18, a mounting bracket 34, lamp 32, and adjuster 48 are also provided. In this embodiment, the adjuster 48 is oriented so as to allow manipulation of the adjuster 48 and aim of the lamp 32 from the front (or lens 42 side) of the lamp 32 or from the rear using the drive 75 at the opposite end of the aiming screw 50. In this embodiment, the adjuster and bracket assembly 30 includes a mounting bracket 34 that may be mounted to a vehicle using threaded mounting studs 36 or other means known in the industry. The lamp 32 including reflector 38, bulb 40, and lens 42, is pivotably attached to the mounting bracket 34 using posts 44 molded into the reflector 38 that snap-fit into arms 46 extending from the mounting bracket 34. As in the previously described embodiments, an adjuster 48 is provided between the mounting bracket 34 and the reflector 38. However, in this embodiment, the head 54 of the adjuster 48 is journaled by the reflector 38 of the lamp 32 and the screw boss 60 is pivotably secured to the mounting bracket 34. As shown in FIG. 15, the head 54 of the adjuster 48 is snap-fit into a head-retaining brace 78 in the reflector 38. Alternatively, the head 54 of the adjuster 48 may be secured to the reflector 38 or the lens 42 as described below with respect to the embodiments shown in FIGS. 19–22. The screw boss 60 has mounting tabs 80 that are snap-fit into a mount 82 extending from the mounting bracket 34 so as to allow the screw boss 60 to pivot within the mount 82. The aiming screw 50 of the adjuster 48 is threaded into the screw boss 60 such that rotation of the aiming screw 50 causes movement of the screw boss 60 along the axis of the aiming screw 50. As the screw boss 60 is retained in the mounting bracket 34, such axial movement causes pivoting of the reflector 38 and adjustment of the aim of the lamp 32. In order to allow for the change in angular orientation of the aiming screw 50 with respect to the mounting bracket 34 when aim adjustment occurs, the screw boss 60 is pivotable with respect to the mounting bracket 34.

In assembling the embodiment of the adjuster and bracket assembly 30 reflected in FIGS. 15–18, the aiming screw 50 is rotated until the screw boss 60 is threaded thereon and positioned for mating to the mounting bracket 34. The mounting tabs 80 of the screw boss 60 are then snap-fits into the mount 82 extending from the mounting bracket. The completed adjuster and bracket assembly 30 is then ready for the attachment of the lamp 32. The installer of the lamp 32 snap-fits the posts 44 extending from the reflector 38 into the arms 46 extending from the mounting bracket 34, and then the head 54 of the adjuster 48 is snap-fit into a head-retaining brace 78 in the reflector 38 of the lamp 32. (If the head 54 of the adjuster 48 is secured to the reflector 38 or the lens 42 as described below with respect to the embodiments shown in FIGS. 19–22, the connection between the head 54 and the reflector 38 or lens 42 is made simultaneously with the mating of the reflector 38 to the mounting bracket 34.) The lamp assembly is then complete and ready to be installed to a vehicle.

Figure 21:
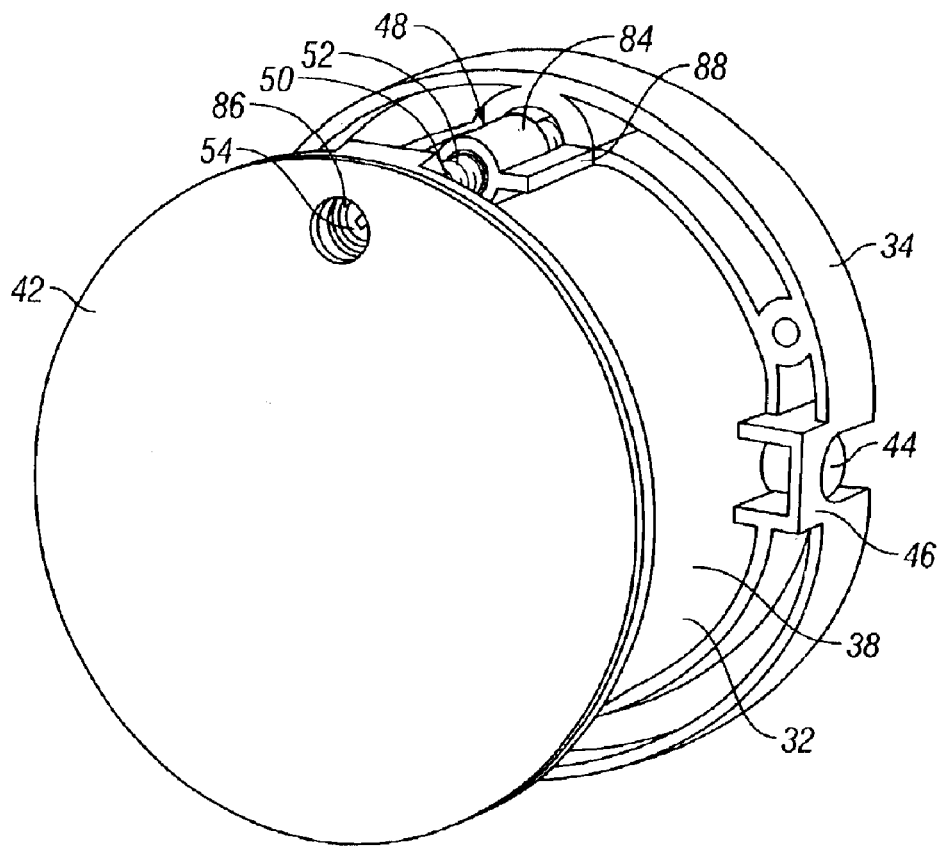
FIG. 21 is a front perspective view of a mounting bracket, lamp, and adjuster in accordance with another embodiment of the assembly.
Figure 22:
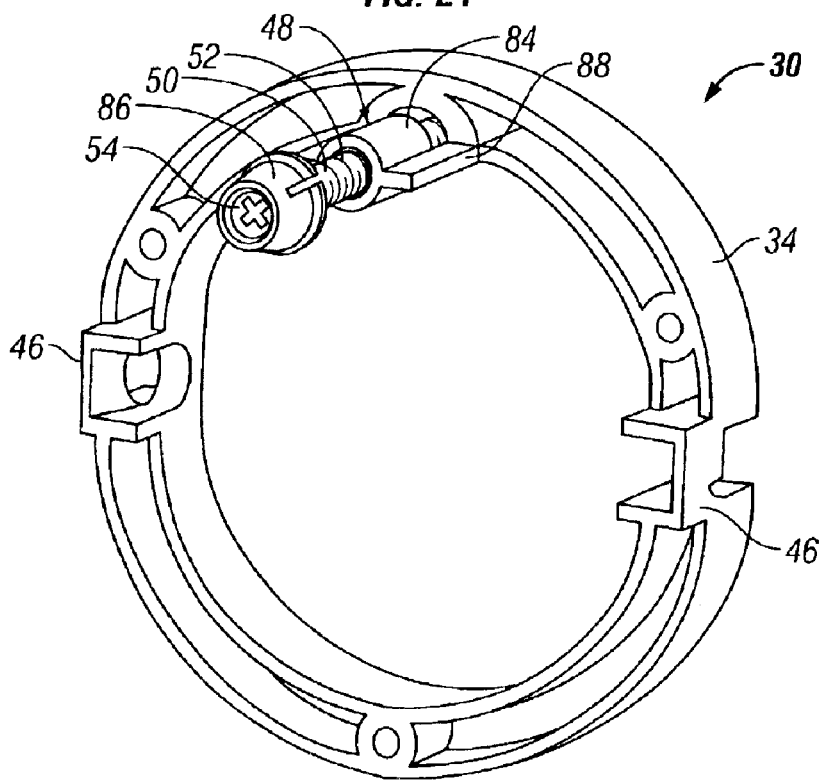
FIG. 22 is a front perspective view of the assembly of FIG. 21, shown without the lamp.

In additional embodiments of the invention, shown in FIGS. 19–22, a mounting bracket 34, lamp 32, and adjuster 48 are also provided. In this embodiment, the adjuster 48 is oriented so as to allow manipulation of the adjuster 48 and aim of the lamp 32 from the front (or lens 42 side) of the lamp 32. In this embodiment, the adjuster and bracket assembly 30 includes a mounting bracket 34 that may be mounted to a vehicle using threaded mounting studs 36 (not shown, see FIG. 8) or other means known in the industry. The lamp 32 including reflector 38, bulb 40 (not shown), and lens 42, is pivotally attached to the mounting bracket 34 using posts 44 molded into the reflector 38 that snap-fit into arms 46 extending from the mounting bracket 34. As in the previously described embodiments, an adjuster 48 is provided between the mounting bracket 34 and the lamp 32. In this embodiment, as in the embodiment shown in FIGS. 15–18 , the head 54 of the adjuster 48 is journaled by the reflector 38 (FIGS. 19 and 20) or the lens 42 (FIGS. 21 and 22) of the lamp 32. This journaling is accomplished using a pivot cap 86 placed over the head 54 of the aiming screw 50 that snap-fits into the head-retaining brace 78 that extends from the reflector 38 (FIG. 19) or snap-fits into the backside of the lens 42 (FIG. 21). However, in this embodiment, rather than using a screw boss 60, an internally threaded arm 84 that extends from the mounting bracket 34 is provided. The threaded portion 52 of the aiming screw 50 is threaded into the arm 84 forming internal threads therein (or the arm 84 may be pre-threaded) such that rotation of the aiming screw 50 causes axial movement of the aiming screw 50 with respect to the internally threaded arm 84. As the head 54 of the aiming screw 50 is retained in the reflector 38 or lens 42, such axial movement causes pivoting and adjustment of the lamp 32. In order to allow for the change in angular orientation of the aiming screw 50 with respect to the mounting bracket 34 when aim adjustment occurs, the arm 84 extends from the mounting bracket 34 using one or more flexible struts 88.

In assembling the embodiment of the adjuster and bracket assembly 30 reflected in FIGS. 19–22, the aiming screw 50 is threaded into the internally threaded arm 84 extending from the mounting bracket until the head 54 of the adjuster 48 is positioned for mating to the frame 38 or lens 42 of the lamp 32. The completed adjuster and bracket assembly 30 is then ready for the attachment of the lamp 32. The installer of the lamp 32 snap-fits the posts 44 extending from the reflector 38 into the arms 46 extending from the mounting bracket 34, simultaneously snap fitting the pivot cap 86 over the head 54 of the aiming screw 50 into the head-retaining brace 78 or into the backside of the lens 42. The lamp assembly is then complete and ready to be installed to a vehicle.

The adjuster and bracket of the present invention may have other applications aside from use in an automotive lamp assemblies and the invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

I claim:

1. An adjuster and bracket assembly comprising:
a mounting bracket dimensioned to pivotally receive a reflector;
an adjuster secured to the mounting bracket such that, when the reflector is pivotally received by the mounting bracket after the adjuster has been secured thereto, the adjuster communicates with the reflector such that rotation of an aiming screw within the adjuster causes pivoting of the reflector within the mounting bracket; and
wherein the aiming screw has a screw boss threaded thereon that is also in sliding engagement with the mounting bracket, the screw boss in communication with the reflector when the reflector is pivotally received by the mounting bracket such that rotation of the aiming screw causes the screw boss to move along the aiming screw and a resultant pivoting of the reflector within the mounting bracket.

2. The adjuster and bracket assembly of claim 1 wherein the screw boss is mounted on a guide rail formed as part of the mounting bracket, rotation of the aiming screw causing sliding of the screw boss along the guide rail.

3. The adjuster and bracket assembly of claim 2 wherein the guide rail is T-shaped.

4. The adjuster and bracket assembly of claim 2 wherein the guide rail is L-shaped.

5. The adjuster and bracket assembly of claim 1 wherein the screw boss mates with a fin extending from the reflector when the reflector is pivotally received by the mounting bracket.

6. The adjuster and bracket assembly of claim 5 wherein the screw boss has a tab that engages a slot in the fin when the reflector is pivotally received by the mounting bracket.

7. The adjuster and bracket assembly of claim 5 wherein the screw boss has at least one engagement channel that engages a slot in the fin when the reflector is pivotally received by the mounting bracket.

8. A lamp assembly comprising:
a mounting bracket dimensioned to pivotally receive a reflector; and
an adjuster secured to the mounting bracket and including an aiming screw threaded into a screw boss, the reflector snap-fitted into the mounting bracket such that the screw boss mates with the reflector, rotation of the aiming screw causing movement of the screw boss along an axis of the aiming screw thereby causing pivoting of the reflector within the mounting bracket, wherein the screw boss slides along a guide rail extending from the mounting bracket.

9. A lamp assembly comprising:
a mounting bracket dimensioned to pivotally receive a reflector; and
an adjuster secured to the mounting bracket and including an aiming screw threaded into a screw boss, the reflector snap-fitted into the mounting bracket such that the screw boss mates with the reflector, rotation of the aiming screw causing movement of the screw boss along an axis of the aiming screw thereby causing pivoting of the reflector within the mounting bracket, wherein the screw boss includes a tab that mates with a fin extending from the reflector.

10. A lamp assembly comprising:
a mounting bracket dimensioned to pivotally receive a reflector; and
an adjuster secured to the mounting bracket and including an aiming screw threaded into a screw boss, the reflector snap-fitted into the mounting bracket such that the screw boss mates with the reflector, rotation of the aiming screw causing movement of the screw boss along an axis of the aiming screw thereby causing pivoting of the reflector within the mounting bracket, wherein the screw boss includes at least one engagement channel that mates with a fin extending from the reflector.

* * * * *